US008891902B2

(12) United States Patent
Chin et al.

(10) Patent No.: US 8,891,902 B2
(45) Date of Patent: Nov. 18, 2014

(54) BAND WEIGHTED COLOUR HISTOGRAMS FOR IMAGE RETRIEVAL

(75) Inventors: Peter Koon Chin, North Sydney (AU); Trevor Gerald Campbell, North Sydney (AU); Ting Shan, North Sydney (AU)

(73) Assignee: Imprezzeo Pty Limited, St. Lucia (AU)

( * ) Notice: Subject to any disclaimer, the term of this patent is extended or adjusted under 35 U.S.C. 154(b) by 905 days.

(21) Appl. No.: 13/028,488

(22) Filed: Feb. 16, 2011

(65) Prior Publication Data

US 2011/0200251 A1    Aug. 18, 2011

(30) Foreign Application Priority Data

Feb. 16, 2010    (AU) ................................ 2010900624

(51) Int. Cl.
*G06K 9/36*    (2006.01)
*G06F 17/30*    (2006.01)
*G06K 9/46*    (2006.01)

(52) U.S. Cl.
CPC .......... *G06K 9/4642* (2013.01); *G06F 17/3025* (2013.01)
USPC ....................................................... 382/284

(58) Field of Classification Search
None
See application file for complete search history.

(56) References Cited

U.S. PATENT DOCUMENTS 5,579,471 A * 11/1996 Barber et al. ................. 715/700

OTHER PUBLICATIONS

Mikihiro Ioka "A Method of Defining the Similarity of Images on the Basis of Color Information", IBM Tokyo Research Lab 1989.*
Stern et al, Adaptive Color Space Switching for Face Tracking in Multi-Colored Lighting Environments, IEEE 2002.*

* cited by examiner

*Primary Examiner* — Chan Park
*Assistant Examiner* — Mark Roz
(74) *Attorney, Agent, or Firm* — IPLM Group, P.A.

(57) ABSTRACT

A method of image retrieval from a target image collection, including segmenting a query image into two or more bands, obtaining weighted color histogram vectors for the two or more bands in the query image, and obtaining weighted color histogram vectors for two or more bands in a target image. A distance measurement is determined between the query image and the target image using the weighted color histogram vectors from corresponding bands in the query image and the target image. Bands in an image can be groups, strips, sections, regions, or the like, and can be linear bands, rectangular bands, circular bands, or the like. The bands are preferably, though not necessarily, concentric or otherwise aligned and any number of bands can be utilized. Also, content based image retrieval is provided that incorporates use of varying photo composition in different regions as a technique for improving accuracy of retrieval.

11 Claims, 5 Drawing Sheets

BAND WEIGHTED COLOUR HISTOGRAMS FOR IMAGE RETRIEVAL

TECHNICAL FIELD

The present invention generally relates to identification, searching and/or retrieval of digital images. The present invention more particularly relates to Content Based Image Retrieval (CBIR) techniques that use one or more band weighted colour histograms to assist in identification, searching and/or retrieval of digital images.

BACKGROUND

Retrieval of images, especially for example facial images, from a relatively large collection of reference images remains a significant problem. It is generally considered impractical for a user to simply browse a relatively large collection of images, for example thumbnail images, so as to select a desired image. Traditionally, images have been indexed by keyword(s) allowing a user to search the images based on associated keywords, with the results being presented using some form of keyword based relevancy test. Such an approach is fraught with difficulties since keyword selection and allocation generally requires human tagging, which is a time intensive process, and many images can be described by multiple or different keywords.

Traditional approaches to content based image retrieval have borrowed techniques from medical and industrial imaging, where content based techniques are used to identify defects, tumours or other characteristics within an image. However, these techniques are not cognisant of the photographic composition inherent in many images, for example images found in the press and media.

There is a need for a method, system, computer program product, article and/or computer readable medium of instructions which addresses or at least ameliorates one or more problems inherent in the prior art.

The reference in this specification to any prior publication (or information derived from the prior publication), or to any matter which is known, is not, and should not be taken as an acknowledgment or admission or any form of suggestion that the prior publication (or information derived from the prior publication) or known matter forms part of the common general knowledge in the field of endeavour to which this specification relates.

BRIEF SUMMARY

In a first broad form, the present invention seeks to provide a form of content based image retrieval that incorporates use of one or more band weighted histograms. In a particular example, the band weighted histograms are band weighted colour histograms.

In a second broad form, the present invention seeks to provide for recognition, searching and/or retrieval of images based on analysis of the content of respective bands between a query image and a target image.

In a third broad form, there is provided a computer-implemented method of image retrieval from a target image collection, the steps performed by a computer system and comprising: segmenting a query image into two or more bands; obtaining weighted colour histogram vectors for the two or more bands in the query image; obtaining weighted colour histogram vectors for two or more bands in a target image; and, determining a distance measurement between the query image and the target image using the weighted colour histogram vectors from corresponding bands in the query image and the target image.

Reference to bands in an image should be taken as a reference to groups, strips, sections, regions, or the like. The geometry of the bands can be widely varied, for example linear bands, rectangular bands, circular bands, etc., can be utilised.

The bands, groups, strips, sections, regions, or the like, are preferably, though not necessarily, concentric or otherwise aligned. Any number of bands, groups, strips, sections, regions, or the like, can be utilised, for example two, three, four, etc., bands.

In a further form, the present invention provides a form of content based image retrieval that incorporates use of varying photo composition in different regions as a technique for improving the accuracy of content based image retrieval.

In a particular example form, a colour histogram (for example represented by a vector, array, matrix, etc.) is extracted from a number of concentric, or otherwise aligned, bands or regions of images in a target image collection. Each target image is then compared with a query or search image (typically supplied or identified by a user) by using respective colour histograms. The colour histogram from at least one, and preferably each band of an image is provided with a weighting appropriate to the nature of the image, or based on the nature of the image collection of which the image is part.

For example, in general news press photographic images, it can be assumed that a central band or region of an image, which typically contains the subject of a photograph, is allocated a larger weighting in the image comparisons than allocated to outer bands, which typically form part of the background of the photograph.

In a further particular form, there is provided a method of image retrieval, including: defining a query image set from one or more selected images; determining band weighted colour histogram vectors from the query image set; obtaining band weighted colour histogram vectors for a plurality of target images; determining a distance measurement using the band weighted colour histogram vectors; and, selecting one or more of the target images based on the distance measurement.

BRIEF DESCRIPTION OF FIGURES

Example embodiments should become apparent from the following description, which is given by way of example only, of at least one preferred but non-limiting embodiment, described in connection with the accompanying figures.

PREFERRED EMBODIMENTS

Figure 1:
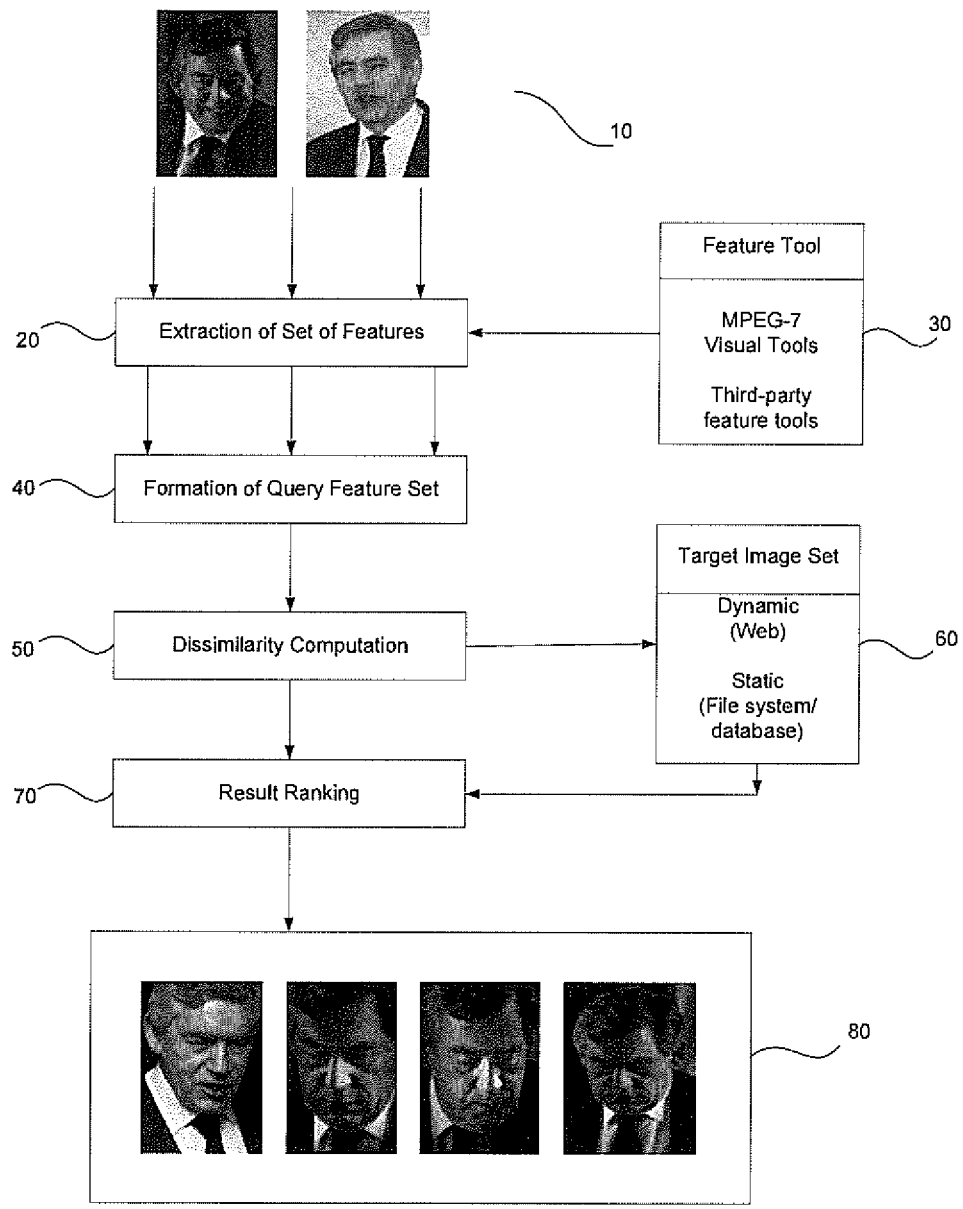
FIG. 1 illustrates a flowchart showing a method of searching and retrieval of images based on the content of the images.

The following modes, given by way of example only, are described in order to provide a more precise understanding of the subject matter of a preferred embodiment or embodiments. In the figures, incorporated to illustrate features of an example embodiment, like reference numerals are used to identify like parts throughout the figures.

In one example form there is provided a computer-implemented method of searching for, identifying and/or retrieving one or more images, for example, but not necessarily, facial images, from a 'target image set', being one or more target images reference images). The method includes constructing or obtaining a 'query feature set' (which may be a single query feature) by identifying, determining, calculating or extracting a 'set of features' from 'one or more selected images' which define a 'query image set' (which may be a single query image).

A 'distance' or 'dissimilarity measurement' is then determined, calculated or constructed, by a computer system, between a 'query feature' from the query feature set and a 'target feature' from the target image set. For example, the dissimilarity measurement may be obtained as a function of the weighted summation of differences or distances between the query features and the target features over all of the target image set. If there are suitable image matches, 'one or more identified images' are identified, obtained and/or extracted from the target image set and can be displayed to a user. Identified images may be selected based on the dissimilarity measurement over all query features, for example by selecting images having a minimum dissimilarity measurement.

The weighted summation uses weights in the query feature set. The order of display of identified images can be ranked, for example based on the dissimilarity measurement. The identified images can be displayed in order from least dissimilar by increasing dissimilarity, although other ranking schemes such as size, age, filename, etc. are also possible. The query feature set may be extracted from a query image set having two or more selected images (selected by the user). The query feature set can be identified, determined and/or extracted using a feature tool such as a software program or computer application.

In one form, the query feature set can be extracted using low level structural descriptions of the query image set (i.e. one or more selected images by a user). For example, the query features or the query feature set could be extracted/selected from one or more of: feature dimensions; feature separations; feature sizes; colour; texture; hue; luminance; structure; feature position; etc.

The query feature set can be viewed, in one form, as an 'idealized image' constructed as a weighted sum of the features (represented as 'feature vectors' of a query image). For example, the idealized image could be represented as $$I = \sum_i w_i x_i$$

where $x_i$ is a feature and $w_i$ is a weight applied to the feature. The weighted summation uses weights derived from the query image set. A program or software application can be used to construct the query feature set by extracting a set of features from the one or more selected images (i.e. the query image set) and construct the dissimilarity measurement.

An example method seeks to identify and retrieve images based on the feature content of the one or more selected images (i.e. the query image set) provided as examples by a user. The query feature set, which the search is based upon, is derived from the one or more example images (i.e. the query image set) supplied or selected by the user. The method extracts a perceptual importance of visual features of images and, in one example, uses a computationally efficient weighted linear dissimilarity measurement or metric that delivers fast and accurate facial image retrieval results.

A query image set Q is a set of example images I typically supplied by a user, so that $Q=\{I_{q1}, I_{q2}, \ldots, I_{qQ}\}$. The set of example selected images may be any number of images, including a single image. A user can provide one, two, three, four, etc. selected images. The user supplied images may be selected directly from a file, document, database and/or may be identified and selected through another image search tool, such as the keyword based Google® Images search tool.

In the following description the target or reference images, sometimes called the image database, is defined as target image set $T=\{I_m:m=1, 2, \ldots, M\}$. The query criteria is expressed as a similarity measure $S(Q, I_j)$ between the query Q and a target image $I_j$ in the target image set. A query process $Q(Q, S, T)$ is a mapping of the query image set Q to a permutation $T_p$ of the target image set T, according to the similarity function $S(Q, I_j)$, where $T_p=\{I_m \epsilon T: m=1, 2, \ldots, M\}$ is a partially ordered set such that $S(Q, I_m) > S(Q, I_{m+1})$. In principle, the permutations are that of the whole image database, in practice only the top ranked output images need be evaluated.

A method of content based image retrieval is illustrated in FIG. 1. The method commences with a user selecting one or more selected images to define the query image set 10. The feature extraction process 20 extracts a set of features from the query image set, for example using feature tool 30 which may be any of a range of third party image feature extraction tools, typically in the form of software applications.

A query feature set is then determined or otherwise constructed at step 40 from the extracted set of features. The query feature set can be conceptually thought of as an idealized image constructed to be representative of the one or more selected images forming the query image set. A dissimilarity measurement/computation is applied at step 50 to one or more target images in the target image set 60 to identify/extract one or more selected images 80 that are deemed sufficiently similar or close to the set of features forming the query feature set. The one or more selected images 80 can be ranked at step 70 and displayed to the user.

Feature Extraction

The feature extraction process 20 is used to base the query feature set on a low level structural description of the query image set. An image object I can be described by a set of features $X=\{x_n:n=1, 2, \ldots, N\}$. Each feature is represented by a $k_n$-dimensional vector $x_n=\{x_1, x_2, \ldots, x_{kn}\}$ where $x_{n,i} \epsilon |0, b_{n,i}| \subset R$, and R is a real number. The $n^{th}$ feature extraction is a mapping from image I to the feature vector as:

$$x_n = f_n(I) \quad (1)$$

The present invention is not limited to extraction of any particular set of features. A variety of visual features, such as colour, texture, objects, etc. can be used. Third party visual feature extraction tools can be used as part of the method or system to extract features.

For example, the popular MPEG-7 visual tool can be suitable. The MPEG-7 Color Layout Descriptor (CLD) is a very compact and resolution-invariant representation of color which is suitable for high-speed image retrieval. MPEG-7 uses only 12 coefficients of 8×8 DCT to describe the content from three sets (six for luminance and three for each chrominance), as expressed as follows:

$$x_{CLD} = (Y_1, \ldots, Y_6, Cb_1, Cb_2, Cb_3, Cr_1, Cr_2, Cr_3) \quad (2)$$

The MPEG-7 Edge Histogram Descriptor (EHD) uses 80 histogram bins to describe the content from 16 sub-images, as expressed as follows:

$$x_{EHD} = (h_1, h_2, \ldots, h_{80}) \qquad (3)$$

While the MPEG-7 set of tools is useful, there is no limitation to this set of feature extraction tools. There are a range of feature extraction tools that can be used to characterize images according to such features as colour, hue, luminance, structure, texture, location, objects, etc.

Query Feature Set Formation

The query feature set is implied/determinable by the example images selected by the user (i.e. the one or more selected images forming the query image set). A query feature set formation module generates a 'virtual query image' as a query feature set that is derived from the user selected image(s). The query feature set is comprised of query features, typically being vectors.

The fusion of features forming a particular may be represented by:

$$x^i = (x_1^i \oplus x_2^i \oplus \ldots \oplus x_n^i) \qquad (4)$$

For a query image set the fusion of features is:

$$X = (x^1 \oplus x^2 \oplus \ldots \oplus x^m) \qquad (5)$$

The query feature set formation implies an idealized query image which is constructed by weighting each query feature in the query feature set used in the set of features extraction step. The weight applied to the $i^{th}$ feature x, is:

$$w_i = f_w^i(x_1^1, x_2^1, \ldots, x_n^1; x_1^2, x_2^2, \ldots, x_n^2; \ldots; x_1^m, x_2^m, \ldots, x_n^m) \qquad (6)$$

The idealized/virtual query image $I_Q$ constructed from the query image set Q can be considered to be the weighted sum of query features $x_i$ in the query feature set:

$$I_Q = \sum_i w_i x_i \qquad (7)$$

Dissimilarity Computation

The feature metric space $X_n$ is a bounded closed convex subset of the $k_n$-dimensional vector space $R^{k_n}$. Therefore, an average, or interval, of feature vectors is a feature vector in the feature set. This is the base for query point movement and query prototype algorithms. However, an average feature vector may not be a good representative of other feature vectors. For instance, the colour grey may not be a good representative of colours white and black.

In the case of a multi-image query image set, the 'distance' or 'dissimilarity' is measured or calculated between the query image set $Q = \{I_{q1}, I_{q2}, \ldots, I_{qQ}\}$ and a target image $I_j \in T$ as:

$$D(Q, I_j) = D(\{I_{q1}, I_{q2}, \ldots, I_{qQ}\}, I_j) \qquad (8)$$

In one example, a distance or dissimilarity function expressed as a weighted summation of individual feature distances can be used as follows:

$$D(I_q, I_m) = \sum_{i=1}^{N} w_i \cdot d_i(x_{qi}, x_{ni}) \qquad (9)$$

Equation (9) provides a measurement which is the weighted summation of a distance or dissimilarity metric d between query feature $x_q$ and queried target feature $x_n$ of a target image from the target image set.

The weights $w_i$ are updated according to the query image set using equation (6). For instance, the user may be seeking to find images of bright coloured cars. Conventional text based searches cannot assist since the query "car" will retrieve all cars of any colour and a search on "bright cars" will only retrieve images which have been described with these keywords, which is unlikely. However, an initial text search on cars will retrieve a range of cars of various types and colours. When the user chooses one or more selected images that are bright the feature extraction and query formation provides greater weight to the luminance feature than, say, colour or texture. On the other hand if the user is looking for blue cars, the one or more selected images chosen by the user would be only blue cars. The query formation would then give greater weight to the feature colour and to the hue of blue rather than to features for luminance or texture.

In each case the dissimilarity computation is determining a similarity value or measurement that is based on the features of the query feature set (as obtained from the query image set selected by the user) without the user being required to define the particular set of features being sought in the target image set. It will be appreciated that this is an advantageous image searching approach.

Result Ranking

The image(s) extracted from the target image set using the query image set can be conveniently displayed according to a relevancy ranking. There are several ways to rank the one or more identified images that are output or displayed. One possible and convenient way is to use the dissimilarity measurement described above. That is, the least dissimilar (most similar) identified images are displayed first followed by more dissimilar images up to some number of images or dissimilarity limit. Typically, for example, the twenty least dissimilar identified images might be displayed.

The distance between the images of the query image set and a target image in the database is defined as follows, as is usually defined in a metric space:

$$d(Q, I_j) = \min_{I_q \in Q} \{d(X_q, X_j)\} \qquad (10)$$

The measure of d in equation (10) has the advantage that the top ranked identified images should be similar to one of the example images from the query image set, which is highly expected in an image retrieval system, while in the case of a previously known prototype queries, the top ranked images should be similar to an image of average features, which is not very similar to any of the user selected example images. The present method should thus provide a better or improved searching experience to the user in most applications.

An example computer-implemented or software application implementation of the method can use Java Servlet and JavaServer pages technologies supported by an Apache Tomcat® web application server. The application searches for target images based on image content on the Internet, for example via keyword based commercial image search services like Google® or Yahoo®. The application may be accessed using any web browsers, such as Internet Explorer or Mozilla/Firebox, and uses a process to search images from the Internet. In a first step, a keyword based search is used to retrieve images from the Internet via a text based image search service to form an initial image set.

In a second step, a user selects one or more images from the initial search set to form the query image set. Selected images provide examples that the user intends to search on, this can be achieved in one embodiment by the user clicking image checkboxes presented to the user from the keyword based search results. In a third step, the user conducts a search of all target images in one or more image databases using a query feature set constructed from the query image set. Alternatively, it should be appreciated that the one or more selected images forming the query image set can come from a variety of other image sources, for example a local storage device, web browser cache, software application, document, etc.

According to another example, the computer-implemented method can be integrated into desktop file managers such as Windows Explorer® or Mac OS X Finder®, both of which currently have the capability to browse image files and son them according to image filenames and other file attributes such as size, file type etc. A typical folder of images is available to a user as a list of thumbnail images. The user can select a number of thumbnail images for constructing the query image set by highlighting or otherwise selecting the images that are closest to a desired image. The user then runs the image retrieval program, which can be conveniently implemented as a web browser plug-in application.

Initial Image Searching

Preferably, the applications hereinbefore described need not totally replace a user's existing search methodology. Rather, the system/method complements an existing search methodology by providing an image refinement or matching capability. This means that there is no major revamp of a user's methodology, especially in a user interface. By provision as a complementary technology, enhancement of a user's searching experience is sought.

A user's existing search application can be used to specify image requirements. Traditionally, users are comfortable with providing a text description for an initial image search. Once a textual description of the desired image is entered by the user, the user's existing search methodology can be executed to provide an initial list of images that best match the textual description. This is considered an original or initial result set.

These original result set images are displayed using a user's existing result display interface. Modifications to the existing results display interface can include the ability for the user to select one or more images as the reference images for refining their image search, i.e. using images to find matching images. Preferably, there is provided functionality in the results display interface (e.g. application GUI) for the user to specify that he/she wants to refine the image search, i.e. inclusion of a 'Refine Search' option. Potentially, this could be an additional 'Refine Search' button on the results display interface.

When a form of 'Refine Search' option is selected, the user's search methodology invokes the image retrieval system to handle the request. The selected images are used as the one or more selected images defining a query image set for performing similarity matches. If required, the search can be configured to search through a complete database to define a new result set.

Figure 2:
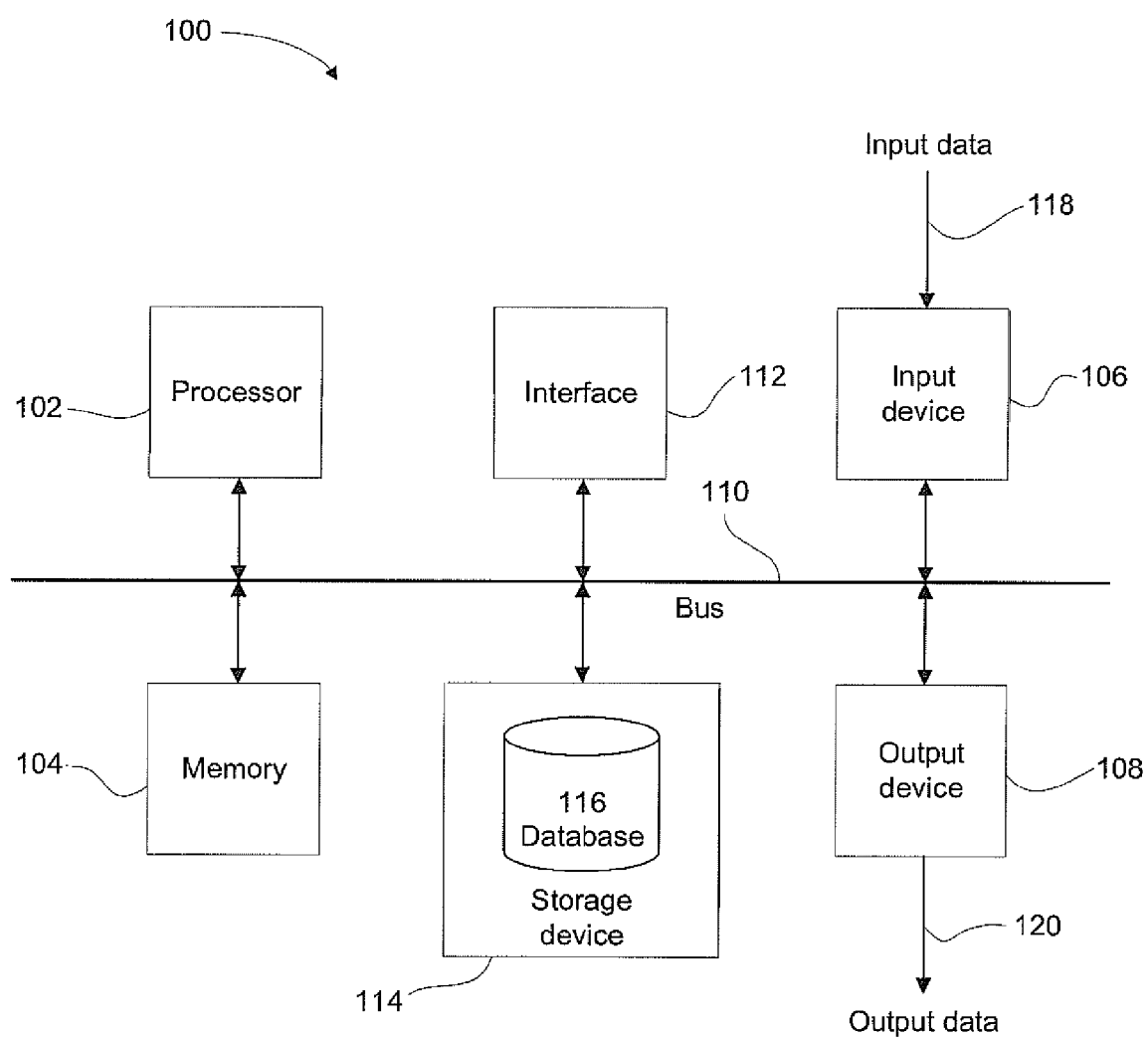
FIG. 2 illustrates a functional block diagram of an example processing system that can be utilised to embody or give effect to an example embodiment.

A particular embodiment of the present invention, such as a computer-implemented method, can be realised using a host computer system or a host processing system, an example of which is shown in FIG. 2. In particular, the processing system 100 generally includes at least one processor 102, or processing unit or plurality of processors, memory 104, at least one input device 106 and at least one output device 108, coupled together via a bus or group of buses 110. In certain embodiments, input device 106 and output device 108 could be the same device. An interface 112 can also be provided for coupling the processing system 100 to one or more peripheral devices, for example interface 112 could be a PCI card or PC card. At least one storage device 114 which houses at least one database 116 can also be provided. The memory 104 can be any form of memory device, for example, volatile or nonvolatile memory, solid state storage devices, magnetic devices, etc. The processor 102 could include more than one distinct processing device, for example to handle different functions within the processing system 100.

Input device 106 receives input data 118 and can include, for example, a keyboard, a pointer device such as a pen-like device or a mouse, audio receiving device for voice controlled activation such as a microphone, data receiver or antenna such as a modem or wireless data adaptor, data acquisition card, etc. Input data 118 could come from different sources, for example keyboard instructions in conjunction with data received via a network. Output device 108 produces or generates output data 120 and can include, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

In use, the processing system 100 is adapted to allow data or information to be stored in and/or retrieved from, via wired or wireless communication means, the at least one database 116. The interface 112 may allow wired and/or wireless communication between the processing unit 102 and peripheral components that may serve a specialised purpose. The processor 102 receives instructions as input data 118 via input device 106 and can display processed results or other output to a user by utilising output device 108. More than one input device 106 and/or output device 108 can be provided. It should be appreciated that the processing system 100 may be any form of terminal, server, PC, laptop, notebook, PDA, mobile telephone, specialised hardware, or the like.

Band Weighted Colour Histograms

Figure 3A:
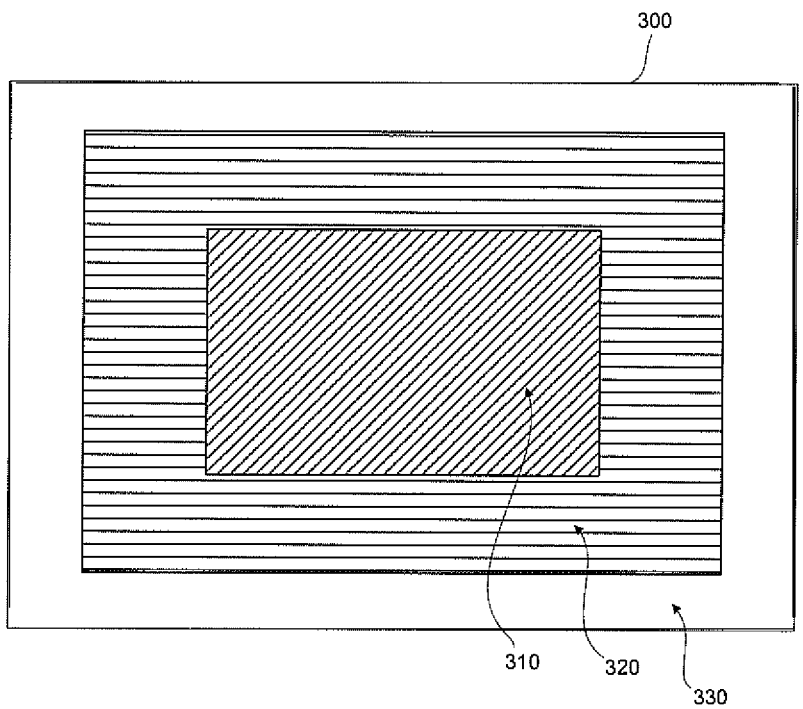
FIG. 3A illustrates an example image segmented into rectangular bands.
Figure 3B:
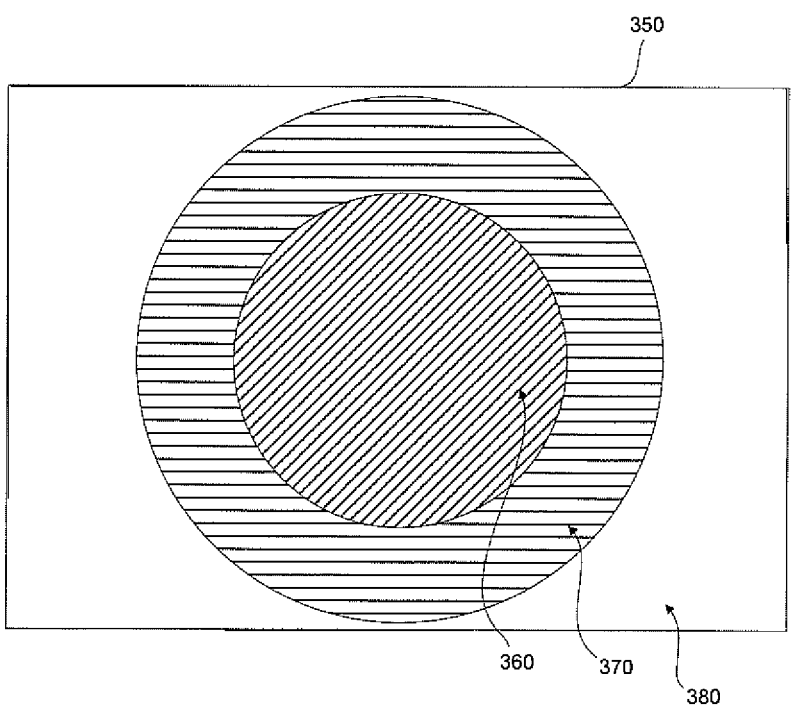
FIG. 3B illustrates a further example image segmented into annular bands.

Referring to FIGS. 3A and 3B, in an example form, the content based image retrieval incorporates use of one or more band weighted colour histograms as basis for determining a distance or dissimilarity measurement. Recognition, searching and/or retrieval of images can be, at least partially, based on analysis of the content of respective bands between one or more query image and a target image. Using one or more band weighted colour histograms the query image set may be a single query image.

Bands 310, 320, 330 in an image 300 can be considered as groups, strips, sections, regions, or the like. The geometry of the bands used can be widely varied, for example linear bands, rectangular bands, circular bands, etc., can be used. As a further example, referring to FIG. 3B, the bands 360, 370, 380 in an image 350 are circular or annular. The bands, groups, strips, sections, regions, or the like, are preferably, though not necessarily, concentric or otherwise aligned. Any number of bands, groups, strips, sections, regions, or the like, can be utilised, for example two, three, four, five, etc., bands.

The extent or position of bands can be widely varied. For example different bands need not be regularly spaced apart, that is two or more bands can be irregularly spaced apart or be of different widths. Also, it is possible that different bands could be formed of two or more different geometries, for example one band being circular and one band being rectangular. The size, position and/or spacing of bands can be selected or automatically determined based on individual images or the general type of images in an image collection. For example, if three bands are used then each can each represent a third of the image. The bands may be centred vertically and horizontally, but for some image collections the bands may be offset, for example towards the top of an image, to better match the general image composition.

A colour histogram is extracted from a number of bands of each image in a target image collection. Each target image can then be compared with one or more query images by using respective colour histograms obtained from different bands. The colour histogram from each band of an image is provided with a weighting appropriate to the nature of the image, or the image collection of which the image is part. For example, in general news press photographic images, it can be assumed that a central band or region of an image, which typically contains a subject of a photograph, should be allocated a larger weighting in the image comparisons than for the outer bands, which would typically form part of the background of the photograph.

Figure 4:
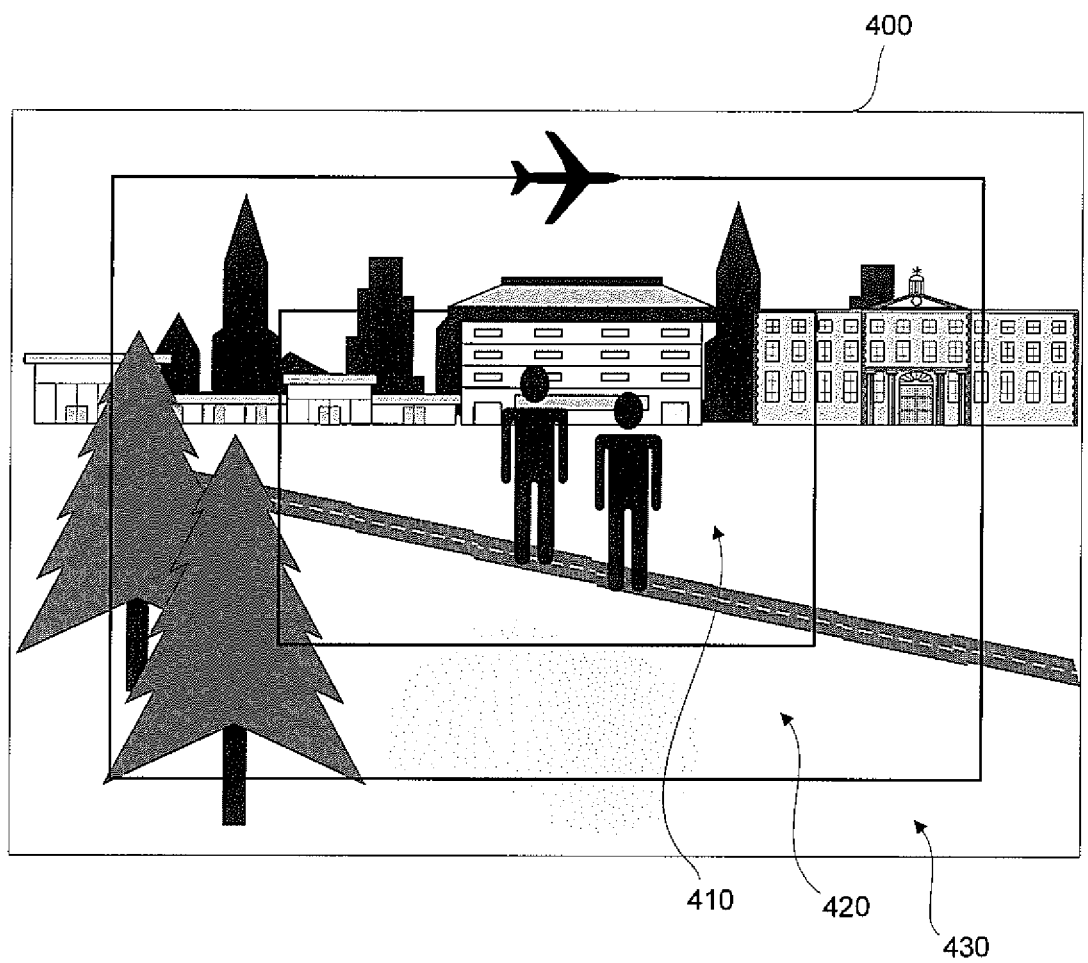
FIG. 4 illustrates a further example image segmented into rectangular bands.

Typically, the most important information tends to be composed towards or near a centre area of an image. Referring to FIG. 4, a further example is illustrated having bands 410, 420, 430 as part of an image 400. If the subject of the image is a person near the centre area of the image 400, there is no important information in the outer band 430 of the image 400. The intermediate band 420 might have some relevant information, but most of the meaningful information is in the centre area 410 of the image 400.

With this insight, a method was devised to extract colour histogram information for each band separately, and use this segmented colour histogram information when searching for similar images in a target image collection.

Figure 5:
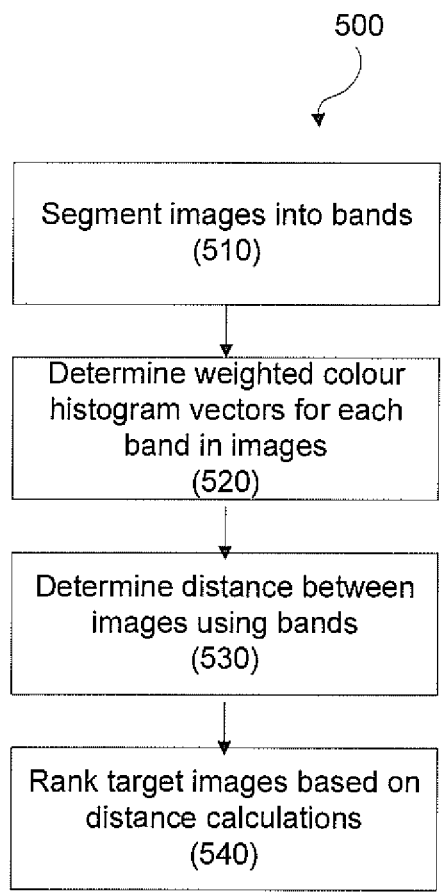
FIG. 5 illustrates a flow chart showing an example method of image retrieval using band weighted histogram vectors.

Referring to FIG. 5, an example method 500 using three bands is now described, however it should be noted that the example can be readily extended to any number of bands. At step 510, a first image and a second image are segmented into bands. At step 520, weighted colour histogram vectors are determined for at least some of the bands in each image. The vectors v11(0 . . . n), v12(0 . . . n), v13(0 . . . n) represent the normalised colour histograms for the outer, intermediate and centre bands of a first image (e.g. a query image or a search image), and the vectors v21(0 . . . n), v22(0 . . . n), v23(0 . . . n) represent the normalised colour histograms for the outer, intermediate and centre bands of a second image (e.g. a target image). Weighting factors w1, w2 and w3 represent three arbitrarily assigned, or alternatively determined or calculated, weighting factors that are applied to combine the distance measurement results, so that the visual distance (i.e. dissimilarity) measurement between the first image and the second image can be calculated at step 530 as:

$$dist = \sum_{i=1}^{n} |v11(i) - v21(i)| * w1 + \quad (10a)$$

$$\sum_{i=1}^{n} |v12(i) - v22(i)| * w3 + \sum_{i=1}^{n} |v13(i) - v23(i)| * w3$$

By comparing the distances of all target images in the target image collection with a query image (or query image set), the target images in the target image collection can be ranked at step 540 and those most closely matching the query image(s) can be returned.

The band weighted colour histogram vectors can be determined or calculated as required when a query image is supplied or otherwise identified. For target images, the band weighted colour histogram vectors are preferably retrieved or obtained from a database, having been previously calculated or determined for efficiency. Alternatively, it is possible for the band weighted colour histogram vectors for target images to be calculated or determined as required prior to a comparison with a query image.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although a preferred embodiment has been described in detail, it should be understood that various changes, substitutions, and alterations can be made by one of ordinary skill in the art without departing from the scope of the present invention.

The present invention may take the form of an entirely hardware embodiment, an entirely software embodiment, firmware, or an embodiment combining software and hardware aspects.

The invention claimed is:

1. A computer-implemented method of image retrieval from a target image collection, the steps performed by a computer system and comprising:
   segmenting a query image into two or more bands;
   obtaining weighted colour histogram vectors for the two or more bands in the query image;
   obtaining weighted colour histogram vectors for two or more bands in a target image; and,
   determining a distance measurement between the query image and the target image using the weighted colour histogram vectors from corresponding bands in the query image and the target image;
   wherein the distance measurement (D) between the query image ($I_q$) and the target image ($I_m$) is determined using:

$$D(I_q, I_m) = \sum_{i=1}^{N} w_i \cdot d_i(x_{qi}, x_{ni})$$

where:
   $d_i$ is the individual distance measurement for selected corresponding bands between a colour histogram $x_q$ of the query image and a colour histogram $x_n$ of the target image; and
   $w_i$ is a weight applied to the $i^{th}$ colour histogram x.

2. The computer-implemented method of claim 1, wherein the two or more bands are two or more groups, strips, sections or regions.

3. The computer-implemented method of claim 1, wherein at least one of the two or more bands is a rectangular band or a circular band.

4. The computer-implemented method of claim 1, wherein the two or more bands are concentric.

5. The computer-implemented method of claim 1, wherein there are three or more bands.

6. The computer-implemented method of claim 1, wherein a central band of an image is allocated a larger weighting than an outer band of the image.

7. The computer-implemented method of claim 1, wherein the two or more bands are of different widths.

8. The computer-implemented method of claim 1, wherein the two or more bands are formed of at least two different geometries of bands.

9. The computer-implemented method of claim 1, wherein the two or more bands are offset from the center of the image.

10. The computer-implemented method of claim 1, wherein the query image includes a facial image.

11. The computer-implemented method of claim 1, wherein retrieved images are ranked in order of display.

\* \* \* \* \*